(12) United States Patent
Lin et al.

(10) Patent No.: US 12,543,182 B2
(45) Date of Patent: Feb. 3, 2026

(54) DATA TRANSMISSION METHOD AND APPARATUS, COMMUNICATION DEVICE, AND STORAGE MEDIUM

(71) Applicant: GUANGDONG OPPO MOBILE TELECOMMUNICATIONS CORP., LTD., Dongguan (CN)

(72) Inventors: Xue Lin, Dongguan (CN); Cong Shi, Dongguan (CN); Shukun Wang, Dongguan (CN); Haitao Li, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 263 days.

(21) Appl. No.: 18/198,002

(22) Filed: May 16, 2023

(65) Prior Publication Data
US 2023/0284231 A1 Sep. 7, 2023

Related U.S. Application Data

(63) Continuation of application No. PCT/CN2020/139568, filed on Dec. 25, 2020.

(51) Int. Cl.
*H04W 72/21* (2023.01)
*H04W 72/1263* (2023.01)
(Continued)

(52) U.S. Cl.
CPC ....... *H04W 72/21* (2023.01); *H04W 72/1263* (2013.01); *H04W 76/19* (2018.02); *H04W 76/27* (2018.02)

(58) Field of Classification Search
None
See application file for complete search history.

(56) References Cited

U.S. PATENT DOCUMENTS

| | | | |
|---|---|---|---|
| 2020/0037345 | A1 | 1/2020 | Ryoo et al. |
| 2020/0053791 | A1 | 2/2020 | Ozturk et al. |

(Continued)

FOREIGN PATENT DOCUMENTS

| | | |
|---|---|---|
| CN | 110022567 A | 7/2019 |
| CN | 110139386 A | 8/2019 |

(Continued)

OTHER PUBLICATIONS

Communication pursuant to Article 94(3) EPC issued in corresponding European Application No. 20966618.9, mailed Jul. 26, 2024, 13 pages.

(Continued)

*Primary Examiner* — Hassan A Phillips
*Assistant Examiner* — Gautam Sharma
(74) *Attorney, Agent, or Firm* — BAYES PLLC

(57) ABSTRACT

A data transmission method performed by a terminal device includes: performing, in response to arrival of first data at the terminal device during a small data transmission (SDT) procedure, a target interaction with a network device, thereby causing the terminal device to enter a connected state; and transmitting, by the terminal device in the connected state, the first data; where the SDT procedure is a data transmission procedure of the terminal device in an inactive state, and the first data includes data not supporting transmission in the SDT procedure.

20 Claims, 4 Drawing Sheets

(51) Int. Cl.
   *H04W 76/19*        (2018.01)
   *H04W 76/27*        (2018.01)

(56) References Cited

U.S. PATENT DOCUMENTS

| | | | | |
|---|---|---|---|---|
| 2021/0127445 | A1* | 4/2021 | d a Silva | H04W 76/25 |
| 2022/0039192 | A1* | 2/2022 | Palat | H04W 12/0431 |
| 2022/0086899 | A1* | 3/2022 | Shih | H04L 5/0053 |
| 2022/0201659 | A1* | 6/2022 | Agiwal | H04W 72/23 |
| 2023/0262818 | A1* | 8/2023 | Kim | H04W 76/19 |
| | | | | 370/328 |
| 2023/0284315 | A1* | 9/2023 | Wang | H04W 74/0833 |
| | | | | 370/329 |
| 2023/0380003 | A1* | 11/2023 | Agiwal | H04W 76/19 |
| 2023/0389117 | A1* | 11/2023 | Laselva | H04W 74/08 |

FOREIGN PATENT DOCUMENTS

| | | |
|---|---|---|
| CN | 111727614 A | 9/2020 |
| CN | 111757556 A | 10/2020 |
| EP | 3944717 A1 | 1/2022 |
| EP | 4209040 A1 | 7/2023 |
| WO | 2022074502 A1 | 4/2022 |

OTHER PUBLICATIONS

Notice of Priority Examination of Patent Application issued in corresponding Chinese Application No. 202080105159.3, mailed on Sep. 19, 2024, 6 pages.
First Examination Opinion Notice issued in corresponding Chinese Application No. 202080105159.3, mailed Oct. 9, 2024, 14 pages.
Extended European Search Report issued in corresponding European application No. 20966618.9, mailed Dec. 1, 2023.
Source: Intel Corporation; Title: SDT control plane procedures and failure handling 3GPP TSG-RAN WG2 Meeting #112-e R2-2008993 Electronic meeting, Nov. 2-13, 2020.
Source: Panasonic; Title: Handling of subsequent small data transmission in RRC_Inactive 3GPP TSG-RAN WG2 Meeting #112 electronic R2-2008935 Online, Nov. 2020.
Source: CATT; Title: Considerations on general aspects and subsequent SDT 3GPP TSG-RAN WG2 #112-e R2-2009367 Online, Nov. 2-13, 2020.
Source: Qualcomm Incorporated; Title: RACH based NR small data transmission 3GPP TSG-RAN WG2 Meeting #111e R2-2007540 Online, Aug. 17-28, 2020.
Source: Ericsson; Title: Subsequent transmissions after initial SDT 3GPP TSG-RAN WG2 #112e Tdoc R2-2009965 Electronic meeting, Nov. 2-13, 2020.
Source: Panasonic; Title: Timer issues for subsequent data transmissions 3GPP TSG-RAN WG2 Meeting#112-e R2-2009119 Online, Nov. 2-Nov. 13, 2020.
Huawei et al., "SDT aspects common for RACH-based and CG-based SDT scheme", R2-2009930, 3GPP TSG-RAN WG2 #112-e Online, Nov. 2-13, 2020.
International Search Report issued in international application No. PCT/CN2020/139568, mailed Sep. 26, 2021.
Written Opinion of the International Searching Authority issued in international application No. PCT/CN2020/139568, mailed Sep. 26, 2021.
3GPP TS 36.300 V16.1.0 (Mar. 2020); Technical Specification Group Radio Access Network; Evolved Universal Terrestrial Radio Access (E-UTRA) and Evolved Universal Terrestrial Radio Access Network (E-UTRAN); Overall description; Stage 2 (Release 16).
3GPP TS 38.331 V16.1.0 (Jul. 2020); Technical Specification Group Radio Access Network; NR; Radio Resource Control (RRC) protocol specification (Release 16).
ETSI MCC, "Report of 3GPP TSG RAN2#112-e meeting, Online", R2-2100001, 3GPP TSG-RAN WG2 meeting #113-e Nov. 2-13, 2020.
CMCC et al., "Revised WID on enhancement of data collection for SON/MDT in NR and EN-DC", RP-20xxxx, 3GPP TSG RAN meeting #88-e Online, Jun. 26-Jul. 3, 2020.
3GPP TS 36.321 V16.1.0 (Jul. 2020); Technical Specification Group Radio Access Network; Evolved Universal Terrestrial Radio Access (E-UTRA); Medium Access Control (MAC) protocol specification (Release 16).
3GPP TS 36.331 V16.1.0 (Jul. 2020); Technical Specification Group Radio Access Network; Evolved Universal Terrestrial Radio Access (E-UTRA); Radio Resource Control (RRC); Protocol specification (Release 16).
3GPP TS 38.321 V16.1.0 (Jul. 2020); Technical Specification Group Radio Access Network; NR; Medium Access Control (MAC) protocol specification (Release 16).
Extended European Search Report issued in corresponding European application No. 25190824.0, mailed on Sep. 30, 2025, 14 pages.

* cited by examiner

DATA TRANSMISSION METHOD AND APPARATUS, COMMUNICATION DEVICE, AND STORAGE MEDIUM

CROSS-REFERENCE TO RELATED APPLICATION

This application is a continuation of PCT application No. PCT/CN2020/139568, filed Dec. 25, 2020, entitled "DATA TRANSMISSION METHOD AND APPARATUS, COMMUNICATION DEVICE, AND STORAGE MEDIUM," which is hereby incorporated by reference in its entirety.

TECHNICAL FIELD

This application relates to the field of wireless communication, and in particular, to a data transmission method and apparatus, a communication device and a storage medium.

BACKGROUND

The RRC_INACTIVE state (i.e., the inactive state) is a new radio resource control (RRC) state introduced by the new radio (NR) system from the perspective of energy saving.

In R17, small data transmission (SDT) has been introduced, and the SDT procedure corresponding to the SDT is a data transmission procedure in the inactive state. Through the SDT procedure, the terminal device is able to complete data transmission in the inactive state without entering the RRC_CONNECTED state (i.e., the connected state), thereby reducing the power consumption and overhead of the terminal device.

During the SDT procedure, if data that does not support transmission in the SDT procedure (which may be referred to as non-SDT data) arrives at the terminal device, there is still no solution proposed in the related art on how to process the non-SDT data.

SUMMARY

Embodiments of this application provide a data transmission method and apparatus, communication device, and storage medium. A target interaction is performed between a terminal device and a network device, so that the terminal device returns from an inactive state to a connected state, and transmits first data, which does not support transmission in the SDT procedure, in the connected state. The technical solution is as follows.

According to an aspect of this application, a data transmission method is provided, which is applied to a terminal device and includes:

performing, in response to arrival of first data at the terminal device during an SDT procedure, a target interaction with a network device, thereby causing the terminal device to enter a connected state; and transmitting, by the terminal device in the connected state, the first data;

where the SDT procedure is a data transmission procedure of the terminal device in an inactive state, and the first data includes data not supporting transmission in the SDT procedure.

According to an aspect of this application, a data transmission method is provided, which is applied to a network device and includes:

causing a terminal device to enter a connected state by performing a target interaction with the terminal device, where the target interaction is initiated by the terminal device in response to arrival of first data during an SDT procedure; and receiving the first data transmitted by the terminal device in the connected state;

where the SDT procedure is a data transmission procedure of the terminal device in an inactive state, and the first data includes data not supporting transmission in the SDT procedure.

According to an aspect of this application, a data transmission apparatus is provided, which is applied in a terminal device and includes: a target interaction performing module and a first data transmitting module;

the target interaction performing module is configured to perform, in response to arrival of first data at the terminal device during an SDT procedure, a target interaction with a network device, thereby causing the terminal device to enter a connected state; and the first data transmitting module is configured to transmit, by the terminal device in the connected state, the first data;

where the SDT procedure is a data transmission procedure of the terminal device in an inactive state, and the first data includes data not supporting transmission in the SDT procedure.

According to an aspect of this application, a data transmission apparatus is provided, which is applied in a network device and includes: a target interaction performing module and a first data receiving module;

the target interaction performing module is configured to cause a terminal device to enter a connected state by performing a target interaction with the terminal device, where the target interaction is initiated by the terminal device in response to arrival of first data during an SDT procedure; and the first data receiving module is configured to receive the first data transmitted by the terminal device in the connected state;

where the SDT procedure is a data transmission procedure of the terminal device in an inactive state, and the first data includes data not supporting transmission in the SDT procedure.

According to an aspect of this application, a terminal device is provided, which includes: a processor and a transceiver connected to the processor; where, the transceiver is configured to perform, in response to arrival of first data at the terminal device during an SDT procedure, a target interaction with a network device, thereby causing the terminal device to enter a connected state; and the transceiver is configured to transmit, by the terminal device in the connected state, the first data;

where the SDT procedure is a data transmission procedure of the terminal device in an inactive state, and the first data includes data not supporting transmission in the SDT procedure.

According to an aspect of this application, a network device is provided, which includes: a processor and a transceiver connected to the processor; where, the transceiver is configured to cause a terminal device to enter a connected state by performing a target interaction with the terminal device, where the target interaction is initiated by the terminal device in response to arrival of first data during an SDT procedure; and the transceiver is configured to receive the first data transmitted by the terminal device in the connected state;

where the SDT procedure is a data transmission procedure of the terminal device in an inactive state, and the first data includes data not supporting transmission in the SDT procedure.

According to an aspect of this application, a computer-readable storage medium is provide, which stores executable instructions therein, where the executable instructions are loaded and executed by a processor, thereby implementing the data transmission method as described in the above-mentioned aspects.

According to an aspect of embodiments of this application, a chip is provided, which includes a programmable logic circuit and/or a program instruction, when running on a computer device, the chip is configured to implement the data transmission method as described in the above-mentioned aspects.

According to an aspect of this application, a computer program product is provided, which, when running on a processor of a computer device, causes the computer device to implement the data transmission method as described in the above-mentioned aspects.

The technical solutions provided by some embodiments of this application include at least the following beneficial effects.

The first data includes data that does not support transmission in the SDT procedure. In response to arrival of the first data at the terminal device during the SDT procedure, the terminal device returns from the inactive state to the connected state by performing a target interaction between the terminal device and the network device, and transmits the first data in the connected state, thereby ensuring the successful transmission of the first data.

BRIEF DESCRIPTION OF THE DRAWINGS

In order to illustrate the technical solutions according to some embodiments of this application more clearly, the following briefly introduces the drawings that are used in the description of the embodiments. Obviously, the drawings in the following description are only some embodiments of this application. For those of ordinary skill in the art, other drawings can also be obtained from these drawings without creative effort.

DETAILED DESCRIPTION

In order to make the objectives, technical solutions and advantages of this application clearer, some embodiments of this application will be further described in detail below with reference to the accompanying drawings.

First, terms involved in the embodiments of this application will be briefly introduced.

RRC State

In NR, a new RRC state, namely RRC_INACTIVE state, is defined for the purpose of reducing air interface signaling, quickly resuming wireless connection, and quickly restoring data service.

In the RRC_INACTIVE state (i.e., inactive state), mobility is cell reselection based on terminal device, a connection exists between the core network (CN) and NR, UE access context is present on a certain network device, and the paging is triggered by the radio access network (RAN), the RAN-based paging area is managed by the RAN, and the network device side knows the location of the terminal device is based on a level of the RAN-based paging area.

Small Data Transmission (SDT)

SDT is a data transmission mode configured for terminal devices in the inactive state. Through the SDT procedure, the terminal device is able to complete the data transmission without entering the connected state, thereby reducing the power consumption and overhead of the terminal device.

In the SDT procedure, when the data that does not support the data transmitted in the SDT procedure (which may be referred to as non-SDT data) arrives, how to deal with the arriving non-SDT data needs to be further discussed. Following solutions are provided with respect to this problem.

Figure 1:
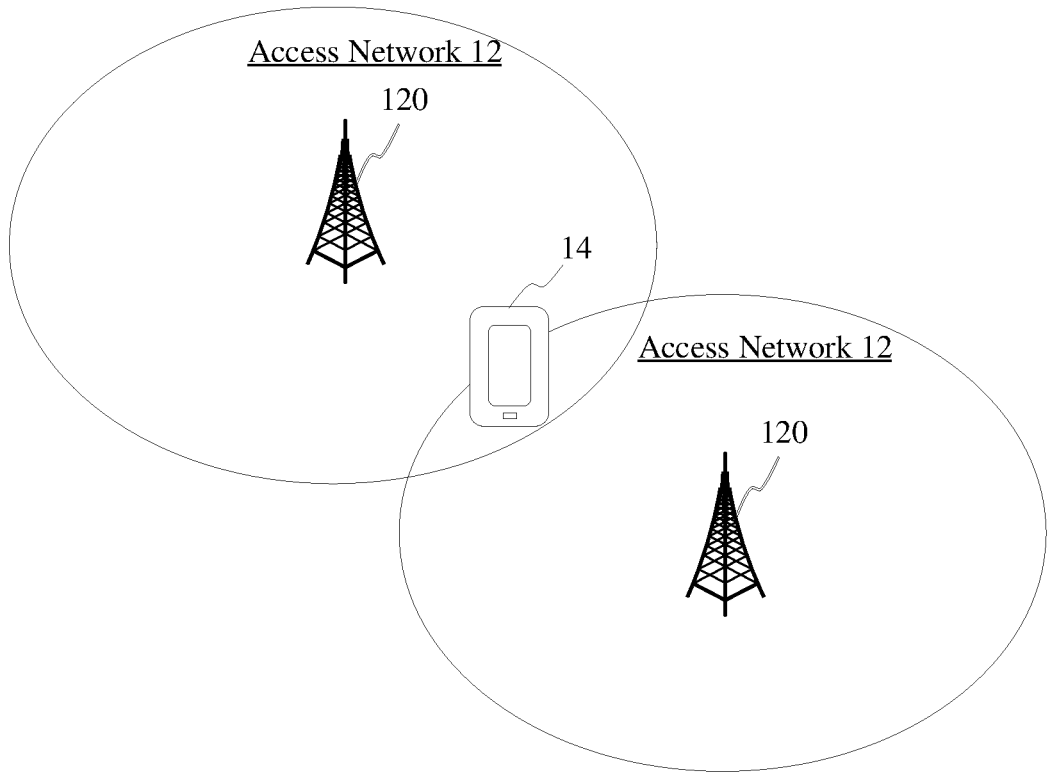
FIG. 1 is a block diagram of a communication system according to some embodiments of this application.

FIG. 1 shows a block diagram of a communication system according to some embodiments of this application. The communication system may include: an access network 12 and a terminal device 14.

The access network 12 includes several network devices 120. The network device 120 may be a base station, which is a device deployed in the access network to provide a wireless communication function for terminals. The base station may include various forms of macro base station, micro base station, relay station, access point and so on. In systems using different radio access technologies, the names of devices with the function of base station may be different. For example, in the LTE system, it may be called eNodeB or eNB; in the 5G NR-U system, it may be called gNodeB or gNB. As the communication technology evolves, the description of "base station" may change. For the convenience of describing the embodiments of this application, the above-mentioned apparatus used for providing the wireless communication function for the terminal device 14 may be collectively referred to as a network device.

The terminal device 14 may include various handheld devices, vehicle-mounted devices, wearable devices, computing devices with wireless communication functions, or other processing devices connected to wireless modems, as well as various forms of user equipment, mobile stations (MS), terminal devices, and the like. For the convenience of description, the devices mentioned above may be collectively referred to as a terminal. The network device 120 and the terminal device 14 communicate with each other through a certain air interface technology, such as a Uu interface. Optionally, the terminal device 14 supports performing the SDT procedure in the inactive state.

The technical solutions according to some embodiments of this application may be applied to various communication systems, such as: Global System of Mobile Communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolution system of the NR system, LTE-based access to Unlicensed spectrum (LTE-U) system, NR-U system, Universal Mobile Telecommunication System (UMTS), Worldwide Interoperability for Microwave Access (WiMAX) communication system, Wireless Local Area Networks (WLAN), Wireless Fidelity (WiFi), next-generation communication systems or other communication systems.

Generally speaking, traditional communication systems support a limited number of connections and are easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, Vehicle to Everything (V2X) system, and the like. The embodiments of this application may also be applied to these communication systems.

Figure 2:
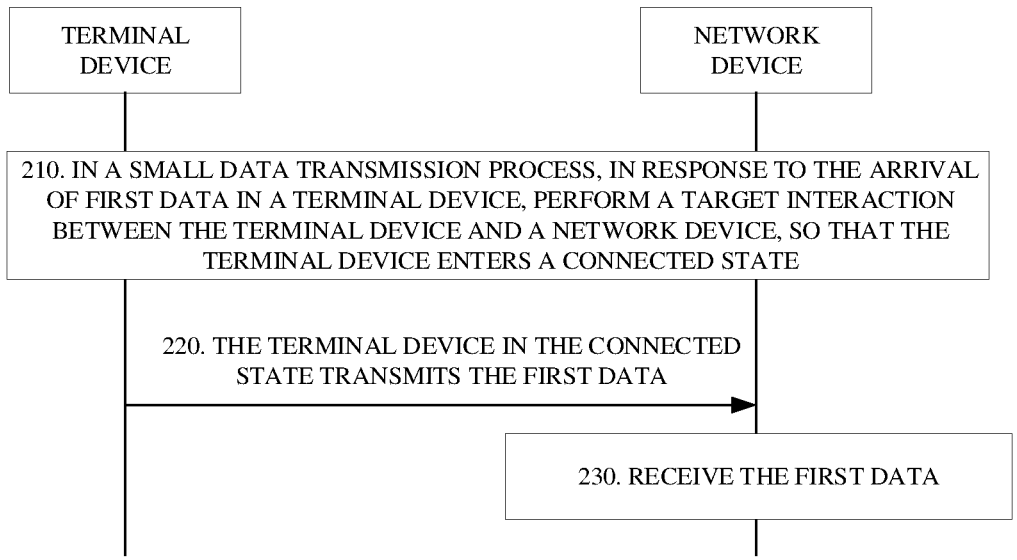
FIG. 2 is a flowchart of a data transmission method according to some embodiments of this application.

FIG. 2 shows a flowchart of a data transmission method according to some embodiments of this application. The method may be applied to the communication system as shown in FIG. 1, and the method includes following steps.

In step 210, in response to arrival of first data at the terminal device during an SDT procedure, a target interaction is performed between the terminal device and the network device, thereby causing the terminal device to enter a connected state.

When the first data arrives at the terminal device, the target interaction is performed between the terminal device and the network device, thereby causing the terminal device to enter the connected state. It may be understood that the target interaction performed between the terminal device and the network device includes at least one interaction between the terminal device and the network device. Based on the at least one interaction, the terminal device returns from the inactive state to the connected state, so as to transmit the first data in the connected state.

The SDT procedure is a data transmission procedure in the inactive state, and the first data includes data that does not support to be transmitted in the SDT procedure.

SDT is a data transmission mode configured for the terminal device in the inactive state, and does not require an RRC connection to be established between the terminal device and the network device. For a terminal device with a small amount of data and a low transmission frequency, if the terminal device must resume the RRC connection with the network device through a connection resume procedure before performing data transmission, and needs to return to the inactive state after completing the data transmission, the power consumption of the terminal device is relatively large. By performing the SDT procedure in the inactive state, the transition of RRC states can be avoided for the terminal device, thereby reducing the power consumption of the terminal device.

Optionally, the SDT procedure includes: a configuration grant (CG)-based SDT procedure; or a random access channel (RACH)-based SDT procedure. The RACH-based SDT procedure may be a 2-step RACH-based SDT procedure, or a 4-step RACH-based SDT procedure.

Optionally, the network device configures the terminal device with DRB information that allows SDT. Based on the DRB information, the data arriving at the terminal device may include data that supports transmission in the SDT procedure, or data that does not support transmission in the SDT procedure (i.e., the first data).

Optionally, the terminal device determines arrival of the first data at the terminal device based on a connection resume indication, where the connection resume indication is an indication received by the RRC layer in the terminal device and sent by a higher layer. That is, during the SDT procedure performed by the terminal device, the RRC layer receives the connection resume instruction triggered by the higher layer, and the terminal device determines, through an inter-layer interaction, that the first data arrives currently.

Optionally, the SDT procedure corresponds to a first timer, and the first timer is started when the terminal device initiates the SDT procedure. Optionally, the terminal device determines whether an inactive-state transmission condition is satisfied, and if yes, initiates the SDT procedure. Embodiments of this application do not limit the specific content of the inactive-state transmission condition.

In step 220, the terminal device in the connected state transmits the first data.

After entering the connected state through the target interaction, the terminal device in the connected state transmits the first data.

Herein, the first data includes data that does not support to be transmitted in the SDT procedure. That is, the first data includes data that needs to be transmitted by the terminal device in the connected state.

In step 230, the network device receives the first data.

The network device receives the first data sent by the terminal device in the connected state.

To sum up, based on the method according to some embodiments of this application, the first data includes data that does not support to be transmitted in the SDT procedure. By performing the target interaction between the terminal device and the network device in response to arrival of the first data at the terminal device during the SDT procedure, the terminal device returns from the inactive state to the connected state, and transmits the first data in the connected state, thereby ensuring successful transmission of the first data.

In some optional embodiments based on FIG. 2, there are two different schemes for the target interaction performed between the terminal device and the network device as follows.

1) The terminal device initiates a connection resume procedure with the network device, thereby causing the terminal device to enter the connected state.

Optionally, after the SDT procedure ends, the terminal device initiates the connection resume procedure by sending a connection resume request.

2) The terminal device sends a first data arrival indication to the network device through uplink SDT, thereby causing the terminal device to enter the connected state.

The first data arrival indication is used for notifying the network device that the first data arrives at the terminal device, and the uplink SDT is the uplink data transmission in the SDT procedure.

During the SDT procedure, the terminal device carries the first data arrival indication in the uplink SDT, and the first data arrival indication is used for notifying the network device that the first data arrives at the terminal device, so that the network device can indicate the terminal device to change the RRC state in time, thereby causing the terminal device to enter the connected state as soon as possible to transmit the first data.

Hereinafter, exemplary descriptions will be given respectively for the above two different schemes for performing the target interaction between the terminal device and the network device, which causes the terminal device to resume the connected state.

1) The terminal device initiates the connection resume procedure with the network device, thereby causing the terminal device to enter the connected state.

Figure 3:
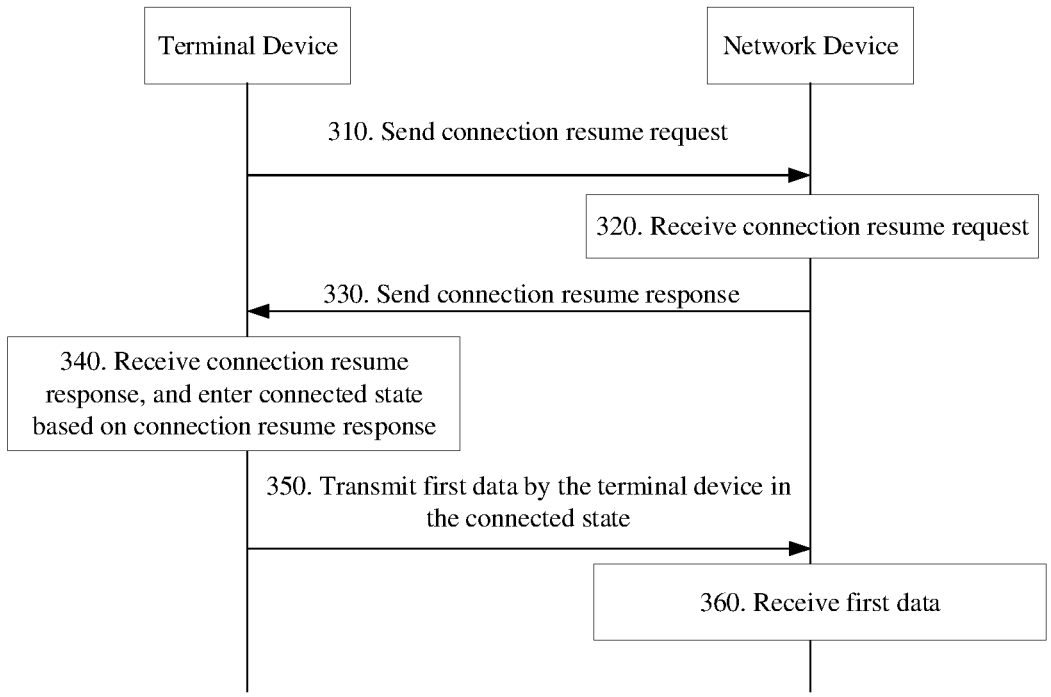
FIG. 3 is a flowchart of a data transmission method according to some embodiments of this application.

In some optional embodiments based on FIG. 2, FIG. 3 shows a flowchart of a data transmission method according to some embodiments of this application. The method may be applied to the communication system as shown in FIG. 1, and the method includes the following steps.

In step 310, the terminal device sends the connection resume request.

The terminal device initiates the connection resume procedure by sending the connection resume request. The connection resume request is used for requesting the network device to resume the RRC connection, thereby causing the terminal device to return to the connected state. Optionally, the terminal device sends the connection resume request after the SDT procedure ends, and the terminal device is in the inactive state.

Optionally, the SDT procedure corresponds to a first timer. In response to arrival of the first data at the terminal device in the SDT procedure, the terminal device determines a state of the first timer. In response to the first timer not being in a running state, the terminal device sends the connection resume request.

The first timer is a timer used for failure detection of the SDT procedure. During running of the first timer, the terminal device performs relevant functions of the SDT procedure. If the first timer is not running, it means that the SDT procedure has ended. Correspondingly, in response to the first timer being in the running state, it means that the SDT procedure is in progress, and the terminal device does not perform the step of sending the connection resume request.

It may be understood that, in response to the first timer not being in the running state, the terminal device may further determine a current RRC state, and send the connection resume request when the RRC state is the inactive state.

Optionally, when referring to that the first timer is not in the running state, it includes any one of the following two situations.

1. The first timer expires.

Optionally, the first timer corresponds to a preset running duration, and when the running of the first timer reaches the running duration, the first timer expires.

Optionally, when the first timer expires, the terminal device may consider that the SDT procedure fails, and the terminal device sends the connection resume request.

2. The first timer is terminated in response to a first message sent by the network device.

Optionally, before step 310, the network device sends the first message, and the terminal device receives the first message correspondingly.

Optionally, the first timer corresponds to a preset running duration, and if the terminal device receives the first message sent by the network device when the running of the first timer does not reach the running duration, the first timer is terminated, and the SDT procedure ends.

In some embodiments, the first message is used for indicating the terminal device to terminate the SDT procedure. Optionally, the first message is further used for indicating the RRC state of the terminal device.

In some embodiments, the first message includes a connected state indication, and the connected state indication is used for indicating the terminal device to enter the connected state. In response to the first message including the connected state indication, the terminal device enters the connected state. Exemplarily, the connected state indication includes radio resource control connection resume (RRCResume) or radio resource control connection setup (RRCSetup). It may be understood that, in the case where the first message includes the connected state indication, the terminal device has already entered the connected state according to the connected state indication, so there is no need to send the connection resume request after receiving the first message.

In another possible implementation manner, the first message includes an inactive state indication, and the inactive state indication is used for indicating the terminal device to remain in the inactive state. In response to the first message including the inactive state indication, the terminal device sends the connection resume request. Exemplarily, the inactive state indication includes radio resource control connection release with suspend configuration (RRCReleasewithsuspendconfig). It may be understood that, in the case where the first message includes the inactive state indication, the terminal device remains in the inactive state, and needs to send the connection resume request to return from the inactive state to the connected state after receiving the first message.

In step 320, the network device receives the connection resume request.

The network device receives the connection resume request sent by the terminal device.

In step 330, the network device sends a connection resume response.

In some embodiments, the connection resume response is used for responding to the connection resume request sent by the terminal device, and the connection resume response is used for indicating the terminal device to enter the connected state.

In step 340, the terminal device receives the connection resume response, and enters the connected state based on the connection resume response.

The terminal device receives the connection resume response sent by the network device, and enters the connected state according to the indication of the connection resume response.

Optionally, for the connection resume procedure in which the terminal device sends the connection resume request to return to the connected state, as described in the above steps 310 to 340, reference may be made to definition of 38.331.5.3.13 in the 3rd Generation Partnership Project (3GPP) standard.

In step 350, the terminal device in the connected state transmits the first data.

In step 360, the network device receives the first data.

To sum up, with the method according to some embodiments, after the SDT procedure ends, the terminal device initiates the connection resume procedure by sending the connection resume request, causing the terminal device to enter the connected state, thereby ensuring transmission of the first data in the connected state.

Moreover, with the method according to some embodiments, the network device may send the first message for terminating the SDT procedure to the terminal device. In the case that the first message indicates the terminal device to enter the connected state, the terminal device directly enters the connected state. When the first message indicates the terminal device to remain in the inactive state, the terminal device initiates the connection resume request to return to the connected state. By using the first message, the signaling interaction required for the terminal device returning to the connected state is minimized, and the communication efficiency between network device and terminal device can be improved.

In addition, with the method according to some embodiments, the SDT procedure corresponds to the first timer, the SDT procedure is valid during the running period of the first timer, and the terminal device performs related functions of the SDT procedure during the running period of the first timer, so as to avoid the problem of large power consumption caused by the terminal device being in the SDT procedure all the time.

Figure 4:
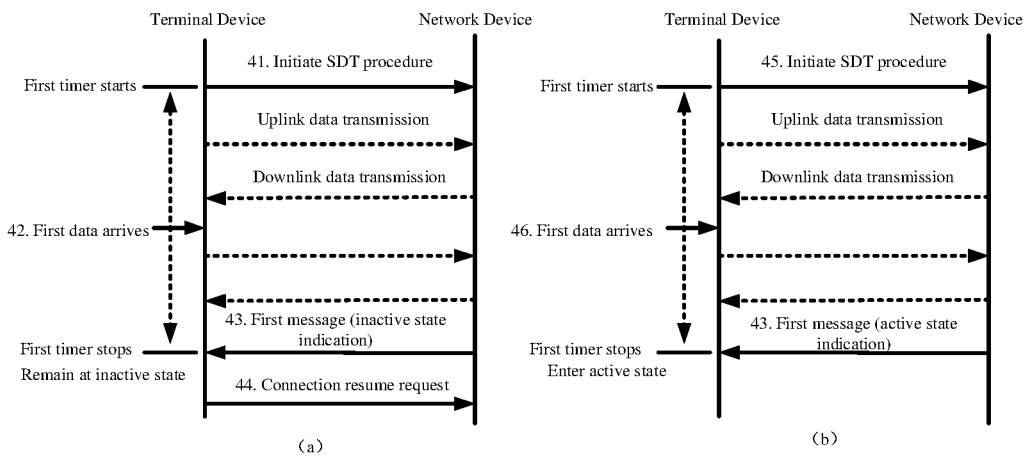
FIG. 4 is a flowchart of a data transmission method according to some embodiments of this application.

Exemplarily, referring to FIG. 4, FIG. 4 shows a flowchart of a data transmission method according to some embodiments of this application.

As shown in (a) of FIG. 4, it includes the following steps.

In step 41, the terminal device initiates the SDT procedure.

When the terminal device initiates the SDT procedure, the first timer is started.

Optionally, after the SDT is initiated, uplink data transmission or downlink data transmission is performed between the terminal device and the network device.

In step 42, the first data arrives at the terminal device.

The first data includes data that does not support for transmission during the SDT procedure.

Optionally, after the first data arrives at the terminal device, uplink data transmission or downlink data transmission continues between the terminal device and the network device.

In step 43, the network device sends the first message to the terminal device, where the first message includes the inactive state indication.

Exemplarily, the inactive state indication includes RRCReleasewithsuspendconfig.

After receiving the first message including the inactive state indication, the terminal device stops running the first timer and remains in the inactive state.

In step 44, the terminal device sends the connection resume request.

The terminal detects that it is currently in the inactive state, and initiates the connection resume procedure to return to the connected state by sending the connection resume request.

As shown in (b) of FIG. 4, it includes the following steps.

In step 45, the terminal device initiates the SDT procedure.

When the terminal device initiates the SDT procedure, the first timer is started.

Optionally, after the SDT is initiated, uplink data transmission or downlink data transmission is performed between the terminal device and the network device.

In step 46, the first data arrives at the terminal device.

The first data includes data that does not support for transmission during the SDT procedure.

Optionally, after the first data arrives at the terminal device, uplink data transmission or downlink data transmission continues between the terminal device and the network device.

In step 47, the network device sends the first message to the terminal device, where the first message includes the connected state indication.

Exemplarily, the connected state indication includes RRCResume or RRCSetup.

After receiving the first message including the connected state indication, the terminal device stops running the first timer and enters the connected state.

2) The terminal device sends the first data arrival indication to the network device through uplink SDT, thereby causing the terminal device to enter the connected state.

Figure 5:
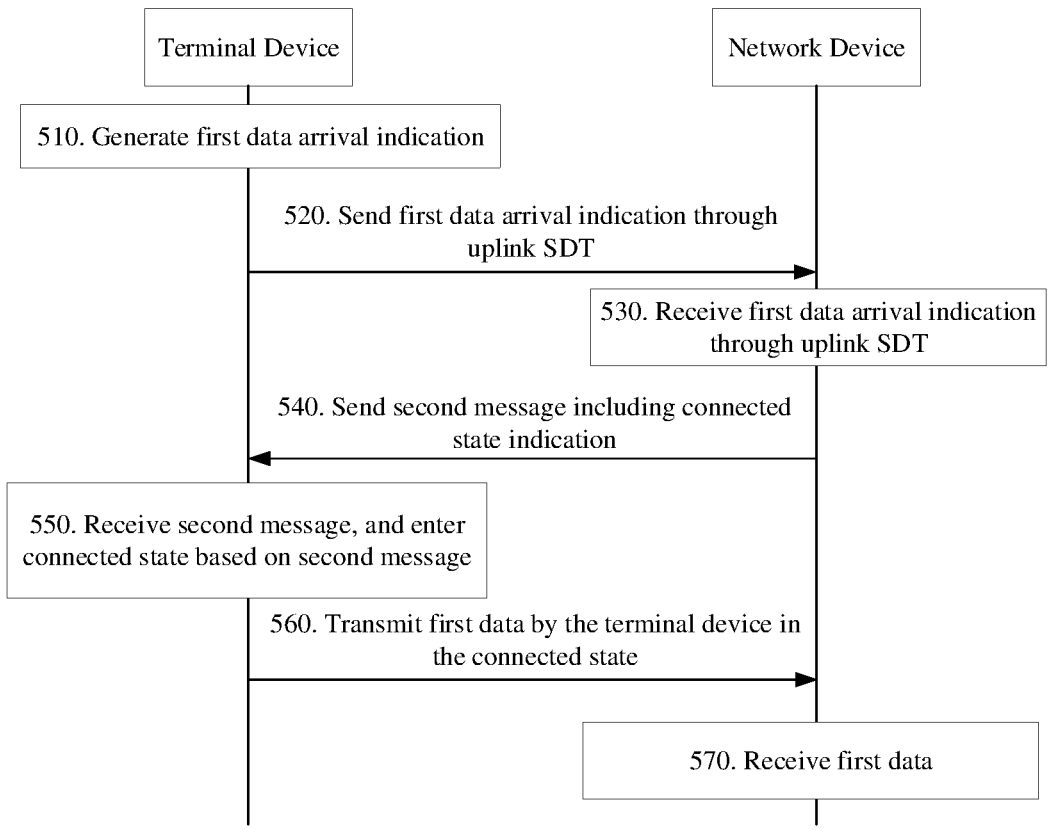
FIG. 5 is a flowchart of a data transmission method according to some embodiments of this application.

In some optional embodiments based on FIG. 2, FIG. 5 shows a flowchart of a data transmission method according to some embodiments of this application. The method may be applied to the communication system as shown in FIG. 1, and the method includes the following steps.

In step 510, the terminal device generates the first data arrival indication.

The first data arrival indication is used for notifying the network device that the first data arrives at the terminal device.

In some embodiments, the RRC layer in the terminal device generates the first data arrival indication. In another possible implementation manner, the RRC layer in the terminal device indicates a lower layer in the terminal device to generate the first data arrival indication. Exemplarily, the RRC layer indicates the Media Access Control (MAC) layer to generate a MAC Control Element (CE).

Optionally, the SDT procedure corresponds to the first timer. The terminal device may determine the state of the first timer; and generate the first data arrival indication in response to the first timer being in the running state.

In some embodiments, the first timer is a timer used for failure detection of the SDT procedure, and during the running of the first timer, the terminal device performs the relevant functions of the SDT procedure. In response to the first timer being in the running state, the terminal device generates the first data arrival indication to notify the network device of the arrival of the first data at the terminal device during the SDT procedure. Correspondingly, in response to the first timer not being in the running state, the terminal device does not generate the first data arrival indication.

Optionally, in the case where the terminal device determines that the first timer expires, the terminal device may consider that the SDT procedure has failed, and the terminal device does not need to perform the following steps 520 to 550. Instead, the terminal device enters the connected state through the connection resume procedure by sending the connection resume request.

In step 520, the terminal device sends the first data arrival indication through uplink SDT.

The uplink SDT is the uplink data transmission in the SDT procedure.

In some embodiments, the terminal device sends the first data arrival indication by performing uplink SDT on an uplink SDT resource. In some embodiments, the uplink SDT resource includes at least one of the following resources: message 3 (i.e., Msg3), a payload of message A (i.e., MsgApayload), a configured grant (CG) uplink resource, and a dynamically scheduled uplink resource. It may be understood that the uplink SDT resources are resources dedicated to the SDT procedure.

In another possible implementation manner, in response to the absence of valid uplink SDT resources, the terminal device initiates a random access procedure. In some embodiments, the first data arrival indication is carried in the Msg3 or the MsgApayload of the random access procedure. Optionally, a cell radio network temporary identifier (C-RNTI) is further carried in the Msg3 or the MsgApayload of the random access procedure, where the C-RNTI supports unique identification of terminal device in a cell.

Optionally, when forming a MAC protocol data unit (PDU), a priority of the first data arrival indication is higher than a priority of user data carried on a dedicated transport channel (DTCH), the priority of the first data arrival indication is higher than a priority of user signaling carried on a dedicated control channel (DCCH), and the priority of the first data arrival indication is higher than or equal to a priority of a buffer state report (BSR) MAC CE. The higher priority corresponding to the first data arrival indication can ensure that the first data arrival indication is preferentially transmitted.

In step 530, the network device receives the first data arrival indication through uplink SDT.

In step 540, the network device sends a second message, where the second message includes the connected state indication.

After receiving the first data arrival indication, the network device feeds back the second message to the terminal device, where the second message includes the connected state indication, thereby causing the terminal device to enter the connected state.

The second message is used for indicating the terminal device to terminate the SDT procedure. Optionally, the second message is further used for indicating the RRC state of the terminal device. For example, the connected state indication in the second message is used for indicating the terminal device to enter the connected state. Exemplarily, the connected state indication includes RRCResume or RRCSetup.

In step 550, the terminal device receives the second message, and enters the connected state based on the connected state indication in the second message.

The terminal device receives the second message sent by the network device, terminates the SDT procedure based on the second message, and enters the connected state according to the connected state indication in the second message.

It may be understood that, the above steps 540 to 550 are exemplarily described with reference to that the second message includes the connected state indication. Optionally, the timing when the terminal device sends the first data arrival indication is close to the timing when the network device sends the second message. If the network device fails to send the second message including the connected state indication according to the first data arrival indication, but instead sends the second message including the inactive state indication, the terminal device needs to send the connection resume request to enter the connected state through the connection resume procedure. Exemplarily, the inactive state indication includes RRCReleasewithsuspendconfig.

In step 560, the terminal device in the connected state transmits the first data.

In step 570, the network device receives the first data.

To sum up, with the method according to some embodiments, during the SDT procedure, the terminal device may generate and send the first data arrival indication to the network device, so that the network device can timely feed back the second message according to the first data arrival indication. Therefore, the terminal device can enter the connected state according to indication of the connected state indication in the second message, so as to transmit the first data.

Moreover, with the method according to some embodiments, the terminal device may send the first data arrival indication to the network device side by using uplink SDT resources or initiating the random access procedure, thereby ensuring successful transmission of the first data arrival indication.

In addition, with the method according to some embodiments, the SDT procedure corresponds to the first timer, the SDT procedure is valid during the running period of the first timer, and the terminal device performs the relevant functions of the SDT procedure during the running period of the first timer, so as to avoid the problem of large power consumption caused by the terminal device being in the SDT procedure all the time.

Figure 6:
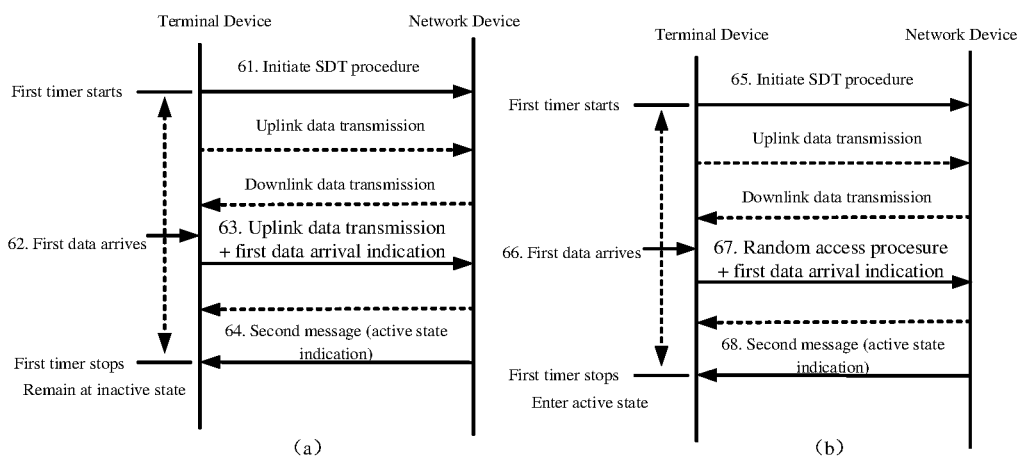
FIG. 6 is a flowchart of a data transmission method according to some embodiments of this application.

Exemplarily, referring to FIG. 6, FIG. 6 shows a flowchart of a data transmission method according to some embodiments of this application.

As shown in (a) of FIG. 6, it includes the following steps.

In step 61, the terminal device initiates the SDT procedure.

When the terminal device initiates the SDT procedure, the first timer is started.

Optionally, after the SDT is initiated, uplink data transmission or downlink data transmission is performed between the terminal device and the network device.

In step 62, the first data arrives at the terminal device.

The first data includes data that does not support for transmission during the SDT procedure.

Optionally, after the first data arrives at the terminal device, uplink data transmission or downlink data transmission continues between the terminal device and the network device.

In step 63, the terminal device sends the first data arrival indication through uplink SDT.

The first data arrival indication is used for notifying the network device that the first data arrives at the terminal device.

Optionally, the uplink transmission resource corresponding to the uplink data transmission includes at least one of message 3 (i.e., Msg3), a payload of message A (i.e., MsgApayload), a CG uplink resource, and a dynamically scheduled uplink resource.

In step 64, the network device sends the second message to the terminal device, where the second message includes the connected state indication.

Exemplarily, the connected state indication includes RRCResume or RRCSetup.

After receiving the second message including the connected state indication, the terminal device stops running the first timer and enters the connected state.

As shown in (b) of FIG. 6, it includes the following steps.

In step 65, the terminal device initiates the SDT procedure.

When the terminal device initiates the SDT procedure, the first timer is started.

Optionally, after the SDT is initiated, uplink data transmission or downlink data transmission is performed between the terminal device and the network device.

In step 66, the first data arrives at the terminal device.

The first data includes data that does not support for transmission during the SDT procedure.

Optionally, after the first data arrives at the terminal device, there is no valid uplink transmission resource between the terminal device and the network device.

In step 67, the terminal device initiates the random access procedure carrying the first data arrival indication to the network device.

The first data arrival indication is used for notifying the network device that the first data arrives at the terminal device.

Optionally, the first data arrival indication is carried in the MsgApayload or Msg3 of the random access procedure.

In step 68, the network device sends the second message to the terminal device, where the second message includes the connected state indication.

Exemplarily, the connected state indication includes RRCResume or RRCSetup.

After receiving the second message including the connected state indication, the terminal device stops running the first timer and enters the connected state.

It should be noted that, the foregoing method embodiments may be implemented separately, or may be implemented in combination, which is not limited in this application.

In each of the above embodiments, the steps performed by the terminal device may be independently implemented as a data transmission method on the terminal device side, and the steps performed by the network device may be independently implemented as a data transmission method on the network device side.

Figure 7:
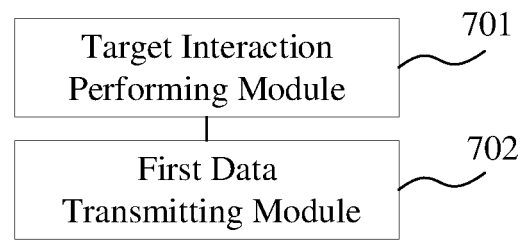
FIG. 7 is a block diagram of a data transmission apparatus according to some embodiments of this application.

FIG. 7 shows a block diagram of a data transmission apparatus according to some embodiments of this application. The apparatus may be implemented as a terminal device, or may be implemented as a part of the terminal device. The apparatus includes: a target interaction performing module 701 and a first data transmitting module 702.

The target interaction performing module 701 is configured to perform, in response to arrival of first data at the terminal device during an SDT procedure, a target interaction with a network device, thereby causing the terminal device to enter a connected state.

The first data transmitting module 702 is configured to transmit, by the terminal device in the connected state, the first data.

The SDT procedure is a data transmission procedure of the terminal device in an inactive state, and the first data includes data not supporting transmission in the SDT procedure.

In some embodiments, the target interaction performing module 701 is configured to initiate a connection resume procedure to the network device, thereby causing the terminal device to enter the connected state.

Alternatively, the target interaction performing module 701 is configured to send a first data arrival indication through uplink SDT, thereby causing the terminal device to enter the connected state, where the first data arrival indication is used for notifying the network device that the first data arrives at the terminal device, and the uplink SDT is uplink data transmission in the SDT procedure.

In some embodiments, the target interaction performing module 701 is configured to send a connection resume request, where the connection resume request is used for requesting to enter the connected state; receive a connection resume response fed back by the network device; and enter the connected state based on the connection resume response.

In some embodiments, the SDT procedure corresponds to a first timer; the target interaction performing module 701 is configured to determine a state of the first timer; and send the connection resume request in response to the first timer not being in a running state.

In some embodiments, when referring to that the first timer is not in the running state, it includes any one of the following two situations: the first timer expires; or, the first timer is terminated in response to a first message sent by the network device.

In some embodiments, in response to termination of the first timer triggered by the first message sent by the network device, the target interaction performing module 701 is configured to receive the first message sent by the network device during running of the first timer; and send the connection resume request in response to the first message including an inactive state indication, where the inactive state indication is used for indicating the terminal device to remain in the inactive state.

In some embodiments, the target interaction performing module 701 is configured to enter the connected state in response to the first message including a connected state indication, where the connected state indication is used for indicating the terminal device to enter the connected state.

In some embodiments, the inactive state indication includes RRCReleasewithsuspendconfig.

In some embodiments, the connected state indication includes RRCResume or RRCSetup.

In some embodiments, the target interaction performing module 701 is configured to generate the first data arrival indication; send the first data arrival indication through the uplink SDT; receive a second message sent by the network device, where the second message includes a connected state indication; and enter the connected state based on the connected state indication.

In some embodiments, the target interaction performing module 701 is configured to send the first data arrival indication by performing the uplink SDT on an uplink SDT resource; where the uplink SDT resource includes at least one of the following resources: Msg3, MsgApayload, a configured grant (CG) uplink resource, and a dynamically scheduled uplink resource.

In some embodiments, the target interaction performing module 701 is configured to initiate a random access procedure in response to absence of a valid uplink SDT resource, where the first data arrival indication is carried in the Msg3 or the MsgApayload of the random access procedure.

In some embodiments, a C-RNTI is further carried in the Msg3 or the MsgApayload of the random access procedure.

In some embodiments, the SDT procedure corresponds to a first timer; the target interaction performing module 701 is configured to determine a state of the first timer; and generate the first data arrival indication in response to the first timer being in a running state.

In some embodiments, the target interaction performing module 701 is configured to generate the first data arrival indication by an RRC layer of the terminal device; or, generate the first data arrival indication by a lower layer of the terminal device in response to an indication of the RRC layer of the terminal device.

In some embodiments, a priority of the first data arrival indication is higher than a priority of user data carried on the DTCH, the priority of the first data arrival indication is higher than a priority of user signaling carried on the DCCH, and the priority of the first data arrival indication is higher than or equal to a priority of a BSR MAC CE.

In some embodiments, the connected state indication includes RRCResume or RRCSetup.

In some embodiments, the SDT procedure corresponds to a first timer; the apparatus further includes a timer starting module; where the timer start module is configured to initiate the SDT procedure and start the first timer.

In some embodiments, the apparatus further includes a first data determining module, where the first data determining module is configured to determine the arrival of the first data at the terminal device based on a connection resume indication, where the connection resume indication is an indication received by an RRC layer of the terminal device and delivered by a higher layer.

In some embodiments, the SDT procedure includes a CG-based SDT procedure; or a RACH-based SDT procedure.

Figure 8:
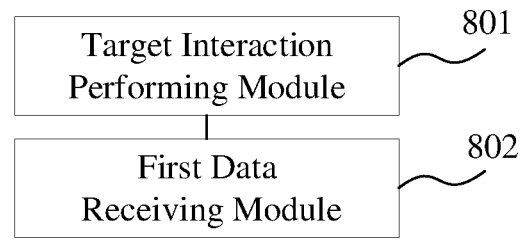
FIG. 8 is a block diagram of a data transmission apparatus according to some embodiments of this application.

FIG. 8 shows a block diagram of a data transmission apparatus according to some embodiments of this application. The apparatus may be implemented as a network device, or may be implemented as a part of a network device, and the device includes a target interaction performing module 801 and a first data receiving module 802.

The target interaction performing module 801 is configured to cause a terminal device to enter a connected state by performing a target interaction with the terminal device, where the target interaction is initiated by the terminal device in response to arrival of first data during an SDT procedure.

The first data receiving module 802 is configured to receive the first data transmitted by the terminal device in the connected state.

The SDT procedure is a data transmission procedure of the terminal device in an inactive state, and the first data includes data not supporting transmission in the SDT procedure.

In some embodiments, the target interaction performing module 801 is configured to cause the terminal device to enter the connected state based on a connection resume procedure initiated by the terminal device.

Alternatively, the target interaction performing module 801 is configured to cause the terminal device to enter the connected state by receiving a first data arrival indication through uplink SDT, where the first data arrival indication is used for notifying the network device that the first data arrives at the terminal device, and the uplink SDT is uplink data transmission in the SDT procedure.

In some embodiments, the target interaction performing module 801 is configured to receive a connection resume request sent by the terminal device, where the connection resume request is used for requesting to enter the connected state; and send a connection resume response, where the connection resume response is used for indicating the terminal device to enter the connected state.

In some embodiments, the SDT procedure corresponds to a first timer; the connection resume request is sent by the terminal device when the first timer is not in a running state.

In some embodiments, when referring to that the first timer is not in the running state, it includes any one of the following two situations: the first timer expires; or, the first timer is terminated in response to a first message sent by the network device.

In some embodiments, in response to termination of the first timer triggered by the first message sent by the network device, the target interaction performing module 801 is configured to send the first message, where the first message includes: an inactive state indication or a connected state indication; and receive the connection resume request in response to the first message including the inactive state indication; where the inactive state indication is used for indicating the terminal device to remain in the inactive state, and the connected state indication is used for indicating the terminal device to enter the connected state.

In some embodiments, the inactive state indication includes RRCReleasewithsuspendconfig.

In some embodiments, the connected state indication includes RRCResume or RRCSetup.

In some embodiments, the target interaction performing module 801 is configured to receive the first data arrival indication through the uplink SDT; and send a second message, where the second message includes a connected state indication, and the connected state indication is used for indicating the terminal device to enter the connected state.

In some embodiments, the target interaction performing module 801 is configured to receive the first data arrival indication by performing the uplink SDT on an uplink SDT resource; where the uplink SDT resource includes at least one of following resources: Msg3, MsgApayload, a CG uplink resource, and a dynamically scheduled uplink resource.

In some embodiments, the target interaction performing module 801 is configured to receive, in response to absence of a valid uplink SDT resource, the first data arrival indication carried in the Msg3 or the MsgApayload of a random access procedure.

In some embodiments, a C-RNTI is further carried in the Msg3 or the MsgApayload of the random access procedure.

In some embodiments, a priority of the first data arrival indication is higher than a priority of user data carried on the DTCH, the priority of the first data arrival indication is higher than a priority of user signaling carried on the DCCH, and the priority of the first data arrival indication is higher than or equal to a priority of a BSR MAC CE.

In some embodiments, the connected state indication includes RRCResume or RRCSetup.

In some embodiments, the SDT procedure includes a CG-based SDT procedure; or a RACH-based SDT procedure.

Figure 9:
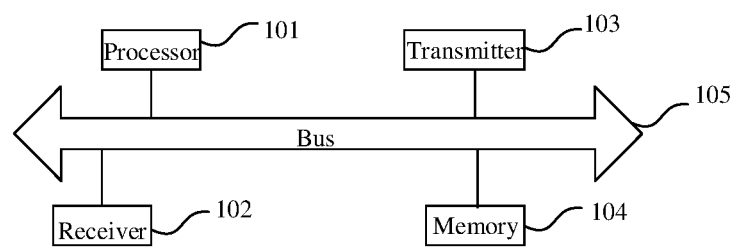
FIG. 9 is a schematic block diagram of a communication device according to some embodiments of this application.

FIG. 9 shows a schematic structural diagram of a communication device (terminal device or network device) according to some embodiments of this application. The communication device includes a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as a communication component, which may be a communication chip.

The memory 104 is connected to the processor 101 through the bus 105.

The memory 104 may be configured to store at least one instruction, and the processor 101 may be configured to execute the at least one instruction, so as to implement various steps in the foregoing method embodiments.

Additionally, memory 104 may be implemented by any type or combination of volatile or non-volatile storage devices including, but not limited to, magnetic or optical disks, Electrically-Erasable Programmable Read Only Memory, (EEPROM), Erasable Programmable Read Only Memory (EPROM), Static Random Access Memory (SRAM), Read Only Memory (Read-Only Memory, ROM), magnetic memory, flash memory, Programmable Read-Only Memory (PROM).

In some embodiments, when the computer device is implemented as a terminal device, the processor and transceiver in the computer device according to some embodiments of this application may perform the steps performed by the terminal device in any of the methods shown in FIG. 2 to FIG. 6 as described above, which will not be repeated here.

In some embodiments, when the computer device is implemented as a terminal device:
the transceiver is configured to perform, in response to arrival of first data at the terminal device during an SDT procedure, a target interaction with a network device, thereby causing the terminal device to enter a connected state; and the transceiver is configured to transmit, by the terminal device in the connected state, the first data;
where the SDT procedure is a data transmission procedure of the terminal device in an inactive state, and the first data includes data not supporting transmission in the SDT procedure.

In some embodiments, when the computer device is implemented as a network device, the processor and transceiver in the computer device according to some embodiments of this application may perform the steps performed by the network device in any of the methods shown in FIG. 2 to FIG. 6 as described above, which will not be repeated here.

In some embodiments, when the computer device is implemented as a network device:
the transceiver is configured to cause a terminal device to enter a connected state by performing a target interaction with the terminal device, where the target interaction is initiated by the terminal device in response to arrival of first data during an SDT procedure;
the transceiver is configured to receive the first data transmitted by the terminal device in the connected state;
where SDT procedure is a data transmission procedure of the terminal device in an inactive state, and the first data includes data not supporting transmission in the SDT procedure.

In some embodiments, a computer-readable storage medium is also provided, where the computer-readable storage medium stores at least one instruction, at least one program, a code set or an instruction set. The at least one instruction, the at least one program, the code set or instruction set is loaded and executed by a processor to implement the data transmission method executed by the communication device according to various method embodiments as described above.

In some embodiments, a chip is also provided, the chip includes a programmable logic circuit and/or program instructions. The chip, when running on a computer device, is configured to implement the data transmission method described in the above embodiments.

In some embodiments, a computer program product is also provided, which, when running on a processor of a computer device, causes the computer device to perform the data transmission method described in the above embodiments.

Those of ordinary skill in the art can understand that all or part of the steps of implementing the above embodiments may be completed by hardware, or may be completed by instructing relevant hardware through a program, and the program may be stored in a computer-readable storage medium. The storage medium mentioned may be a read-only memory, a magnetic disk, an optical disk, or the like.

The above are only some optional embodiments of this application, and are not intended to limit this application. Any modifications, equivalent replacements, improvements, and the like made within the spirit and principles of this application shall fall within the protection scope of this application.

What is claimed is:

1. A data transmission method, being applied to a terminal device and comprising:
performing, in response to arrival of first data at the terminal device during a small data transmission (SDT) procedure, a target interaction with a network device, thereby causing the terminal device to enter a connected state; and
transmitting, by the terminal device in the connected state, the first data;
wherein the SDT procedure is a data transmission procedure of the terminal device in an inactive state, and the first data comprises data not supporting transmission in the SDT procedure,
wherein performing the target interaction with the network device, thereby causing the terminal device to enter the connected state, comprises:
generating a first data arrival indication by a radio resource control (RRC) layer of the terminal device, wherein the first data arrival indication is used for notifying the network device that the first data arrives at the terminal device;
sending the first data arrival indication by performing uplink SDT on an uplink SDT resource, wherein the uplink SDT is uplink data transmission in the SDT procedure, and the uplink SDT resource comprises at least one of following resources: a configured grant (CG) uplink resource, and a dynamically scheduled uplink resource;
receiving a second message sent by the network device, wherein the second message comprises a connected state indication; and
entering the connected state based on the connected state indication.

2. The method according to claim 1, wherein,
the connected state indication comprises RRCResume or RRCSetup.

3. The method according to claim 1, wherein the SDT procedure corresponds to a first timer, and the method further comprises:
initiating the SDT procedure and starting the first timer.

4. The method according to claim 1, further comprising:
determining the arrival of the first data at the terminal device based on a connection resume indication, wherein the connection resume indication is an indication received by the RRC layer of the terminal device and delivered by a higher layer.

5. The method according to claim 1, wherein the SDT procedure corresponds to a first timer, and generating the first data arrival indication comprises:
determining a state of the first timer; and
generating the first data arrival indication in response to the first timer being in a running state.

6. The method according to claim 1, wherein,
a priority of the first data arrival indication is higher than a priority of user data carried on a dedicated transport channel (DTCH), the priority of the first data arrival indication is higher than a priority of user signaling carried on a dedicated control channel (DCCH), and the priority of the first data arrival indication is higher than or equal to a priority of a buffer state report (BSR) medium access control (MAC) control element (CE).

7. The method according to claim 1, wherein the SDT procedure comprises:
a CG-based SDT procedure; or,
a random access channel (RACH)-based SDT procedure.

8. A terminal device, comprising:
a memory, configured to store at least one instruction, and
a processor, configured to execute the at least one instruction to cause the terminal device to:
perform, in response to arrival of first data at the terminal device during a small data transmission (SDT) procedure, a target interaction with a network device, thereby causing the terminal device to enter a connected state; and transmit, by the terminal device in the connected state, the first data;
wherein the SDT procedure is a data transmission procedure of the terminal device in an inactive state, and the first data comprises data not supporting transmission in the SDT procedure,
wherein the terminal device is further caused to:
generate a first data arrival indication by a radio resource control (RRC) layer of the terminal device, wherein the first data arrival indication is used for notifying the network device that the first data arrives at the terminal device;
send the first data arrival indication by performing uplink SDT on an uplink SDT resource, wherein the uplink SDT is uplink data transmission in the SDT procedure, and the uplink SDT resource comprises at least one of following resources: a configured grant (CG) uplink resource, and a dynamically scheduled uplink resource;
receive a second message sent by the network device, wherein the second message comprises a connected state indication; and
enter the connected state based on the connected state indication.

9. The terminal device according to claim 8, wherein the SDT procedure corresponds to a first timer and the terminal device is further caused to:
determine a state of the first timer; and
generate the first data arrival indication in response to the first timer being in a running state.

10. The terminal device according to claim 8, wherein, a priority of the first data arrival indication is higher than a priority of user data carried on a dedicated transport channel (DTCH), the priority of the first data arrival indication is higher than a priority of user signaling carried on a dedicated control channel (DCCH), and the priority of the first data arrival indication is higher than or equal to a priority of a buffer state report (BSR) medium access control (MAC) control element (CE).

11. The terminal device according to claim 8, wherein, the connected state indication comprises RRCResume or RRCSetup.

12. The terminal device according to claim 8, wherein the SDT procedure corresponds to a first timer and the terminal device is further caused to;
initiate the SDT procedure and start the first timer.

13. The terminal device according to claim 8, wherein the terminal device is further caused to:
determine the arrival of the first data at the terminal device based on a connection resume indication, wherein the connection resume indication is an indication received by the RRC layer of the terminal device and delivered by a higher layer.

14. The terminal device according to claim 8, wherein the SDT procedure comprises:
a CG-based SDT procedure; or,
a random access channel (RACH)-based SDT procedure.

15. A network device, comprising;
a memory, configured to store at least one instruction, and
a processor, configured to execute the at least one instruction to cause the network device to:
cause a terminal device to enter a connected state by performing a target interaction with the terminal device, wherein the target interaction is initiated by the terminal device in response to arrival of first data during a small data transmission (SDT) procedure; and
receive the first data transmitted by the terminal device in the connected state;
wherein the SDT procedure is a data transmission procedure of the terminal device in an inactive state, and the first data comprises data not supporting transmission in the SDT procedure,
wherein the network device is further caused to:
receive the first data arrival indication sent by the terminal device by performing uplink SDT on an uplink SDT resource, wherein the first data arrival indication is generated by a radio resource control (RRC) layer of the terminal device and used for notifying the network device that the first data arrives at the terminal device, the uplink SDT is uplink data transmission in the SDT procedure, and the uplink SDT resource comprises at least one of following resources: a configured grant (CG) uplink resource, and a dynamically scheduled uplink resource; and
send a second message to the terminal device, wherein the second message comprises a connected state indication, and the connected state indication is used for indicating the terminal device to enter the connected state.

16. The network device according to claim 15, wherein the SDT procedure corresponds to a first timer, and
the first data arrival indication is generated by the terminal device in response to the first timer being in a running state.

17. The network device according to claim 15, wherein, a priority of the first data arrival indication is higher than a priority of user data carried on a dedicated transport channel (DTCH), the priority of the first data arrival indication is higher than a priority of user signaling carried on a dedicated control channel (DCCH), and the priority of the first data arrival indication is higher than or equal to a priority of a buffer state report (BSR) medium access control (MAC) control element (CE).

18. The network device according to claim 15, wherein, the connected state indication comprises RRCResume or RRCSetup.

19. The network device according to claim 15, wherein, the arrival of the first data at the terminal device is determined based on a connection resume indication, wherein the connection resume indication is an indication received by the RRC layer of the terminal device and delivered by a higher layer.

20. The network device according to claim 15, wherein the SDT procedure comprises:
a CG-based SDT procedure; or,
a random access channel (RACH)-based SDT procedure.

* * * * *